Jan. 14, 1969   J. P. WOODS ET AL   3,421,730
PRESSURE INJECTION MOLD

Original Filed Aug. 29, 1962   Sheet 1 of 2

INVENTORS
John P. Woods
Clifford D. Dransfield
Henry R. Barta

United States Patent Office 3,421,730
Patented Jan. 14, 1969

3,421,730
PRESSURE INJECTION MOLD
John P. Woods, Anchorage, Alaska, and Clifford D. Dransfield and Henry R. Barta, Dallas, Tex., assignors to Atlantic Richfield Company, Philadelphia, Pa., a corporation of Pennsylvania
Original application Aug. 29, 1962, Ser. No. 220,242, now Patent No. 3,375,574, dated Apr. 2, 1968. Divided and this application Mar. 5, 1968, Ser. No. 710,519
U.S. Cl. 249—142             13 Claims
Int. Cl. B28b 7/16

ABSTRACT OF THE DISCLOSURE

A pressure injection mold adapted to form a unitary bobbin for a magnetic transducer has two cooperatively engageable sections. Each section has a similar, rectangularly shaped depression extending the length of one dimension. Cavities, notches and shoulders in each depression combine with a removable metallic core placed in the depressions to provide voids which when filled with a pressure injected plastic produce the bobbin. The core has a sleeve forming subassembly.

CROSS-REFERENCE TO RELATED APPLICATION

This is a division of copending application Ser. No. 220,242, filed Aug. 29, 1962, now U.S. Patent No. 3,375,574, issued Apr. 2, 1968.

BACKGROUND OF THE INVENTION

The present invention relates to a pressure injection mold for producing a bobbin which is used in assembling a magnetic recording and reproducing transducer especially suited for operation with a delay drum.

Many types of computers and automatic data processing equipment require the use of delay drums. This drum operates continuously and usually at much higher speeds than most magnetic recording systems. Under such conditions, there is a need for extremely high quality magnetic transducers of uniform characteristics. This quality and uniformity is difficult to obtain with ordinary production techniques.

This invention provides a pressure injection mold which produces a bobbin of delicate uniform quality which lends itself to mass production techniques. The bobbin is used in assembling magnetic transducers of sufficiently high quality and uniform characteristics to be suitable for operation with high speed delay drums.

SUMMARY OF THE INVENTION

Figure 1:
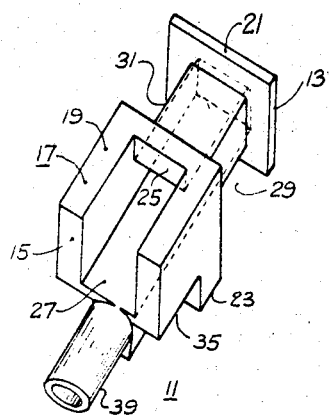
FIGURES 1, 2 and 3 show isometric views of a bobbin produced by the pressure injection mold of this invention. Each view is rotated 90 degrees about the longitudinal axis of the bobbin.

A pressure injection mold adapted to form a unitary bobbin for a magnetic transducer has cooperatively engageable first and second mold sections. Each section has a similar depression extending the length of one dimension of the mold sections. The length of depression is divided between a deep, wide cavity and a narrower, shallower cavity. The two cavities communicate with each other since the narrow cavity extends from the wide cavity. A metallic core having a generally rectangular configuration is adapted to fill portions of the narrow and wide cavities in the depressions in the mold sections. The remaining portions of the depressions left void are filled with pressure injected plastic to form the bobbin. The core has a locating pin adapted to fit into an aperture in one of the sections. There is a sleeve forming subassembly mounted within the core to form an integral sleeve on the bobbin.

The narrow and wide cavities have walls shaped to form exterior surfaces on the bobbin which surfaces include a mating surface which is used to align or mate two bobbins together when the bobbins are used to produce a magnetic transducer. The walls of the cavity are also shaped to form indentations in the bobbin and to cooperate with the core to form an aperture in the bobbin for receiving magnetic laminations when the bobbin is used to manufacture a magnetic transducer. The location, shape, length and size of the core cooperates with the walls of the cavities to produce the various features of the bobbin.

More specifically, the shallower narrow cavity may have an enlarged portion which extends outwardly away from the longitudinal axis of the cavity and is around the three sides of the narrow cavity. This enlarged portion is between the two ends of the narrow cavity and is positioned to form one end of the bobbin. The enlarged portion has a first planar surface which forms a portion of the mating surface of the bobbin.

The deeper wide cavity has a first planar surface extending from the inner end of the wide cavity which end is at the juncture of the wide and narrow cavities. This first planar surface is in the same plane as the first planar surface of the enlarged portion of the narrower cavity so that the two planar surfaces of the two cavities form portions of the mating surface of the bobbin.

The length of the core may be divided into a thick wide core portion, sized to fill a portion of the wide cavities in the mold sections, and a thinner narrower core portion which extends longitudinally from the end of the wide core portion. The length and position of the narrower core portion is such that the end of the core will extend into the narrow cavity to at least the enlarged portion of the narrow cavity. The size of the narrower core portion leaves a space in the narrow cavities of the mold sections which encircles the narrower core portion. When the bobbin is formed this part of the core forms an aperture through the bobbin extending from the wide cavity through the enlarged portion of narrow cavity.

The thinner narrower core portion may also have an intermediate part extending longitudinally from the end of the wide core portion. This intermediate part has a first planar surface adapted to contact the first planar surface of the wide cavity and a second planar surface substantially perpendicular to the first planar surface. This second planar surface extends toward the longitudinal axis of the core and is positioned to leave a gap between the second surface and the inner end of the wide cavity when the core is positioned in the mold. This intermediate part of the narrow portion of the core causes an indentation to be left in the bobbin which indentation will be in communication with an aperture in the bobbin caused by the narrow portion of the core.

On the opposite side of the wide cavity from the first planar surface, there may be a shoulder which extends inward toward the longitudinal axis of the wide cavity thereby reducing the width of the wide cavity. This shoulder is spaced longitudinally from the inner end of the wide cavity so as to leave an indentation. On the opposite side of the shoulder from this indentation is a notch which opens into the wide cavity.

The sleeve forming subassembly may include an aperture extending along a portion of the thick wide core portion parallel to the longitudinal axis of the core. There is a pin mounted on the core extending through the aperture. The pin is smaller than the aperture so that there is a gap between the walls of the aperture and the pin. This gap encircles the pin. When this gap is filled with plastic and the pin removed, a tubular sleeve will be formed. The end of the pin is positioned to contact a wall of the wide cavity so that, when the bobbin is removed from the mold and core, there will be a hole through the sleeve and a portion of the bobbin. When there is a shoulder in the wide cavity, the pin may contact a wall of a notch in the shoulder and the size, length, and position of the pin will be such that the walls of the cavities will form a shoulder adjacent the deep, wide cavities which partially encircle the pin. There will be a gap between the pin and the walls of the notches, but there will be no gap between the end of the pin and one wall of the notch. Thus, when the notch is filled with plastic, the pin will create a hole through this plastic.

DESCRIPTION OF PREFERRED EMBODIMENTS

Figure 5:
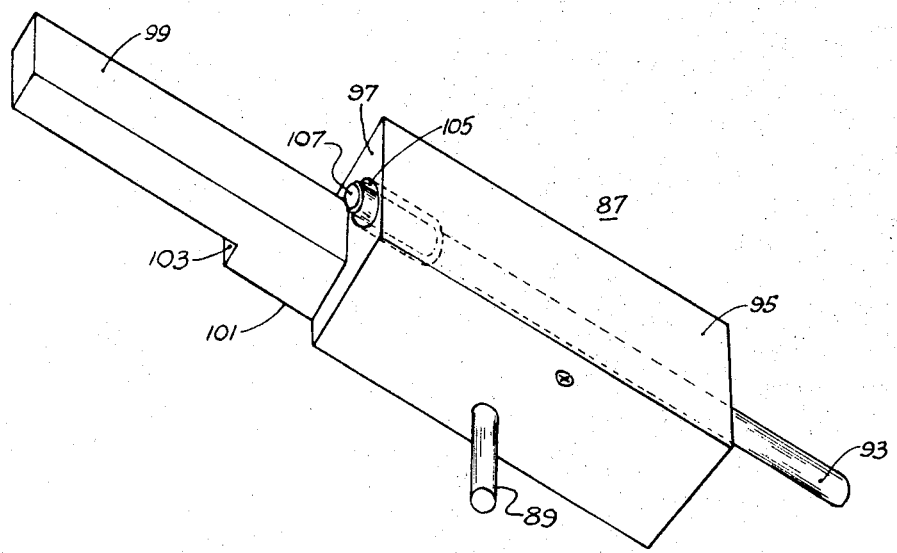
FIGURE 5 shows a detailed isometric view of the removable core used in the pressure injection mold of FIGURE 4.
Figure 4:
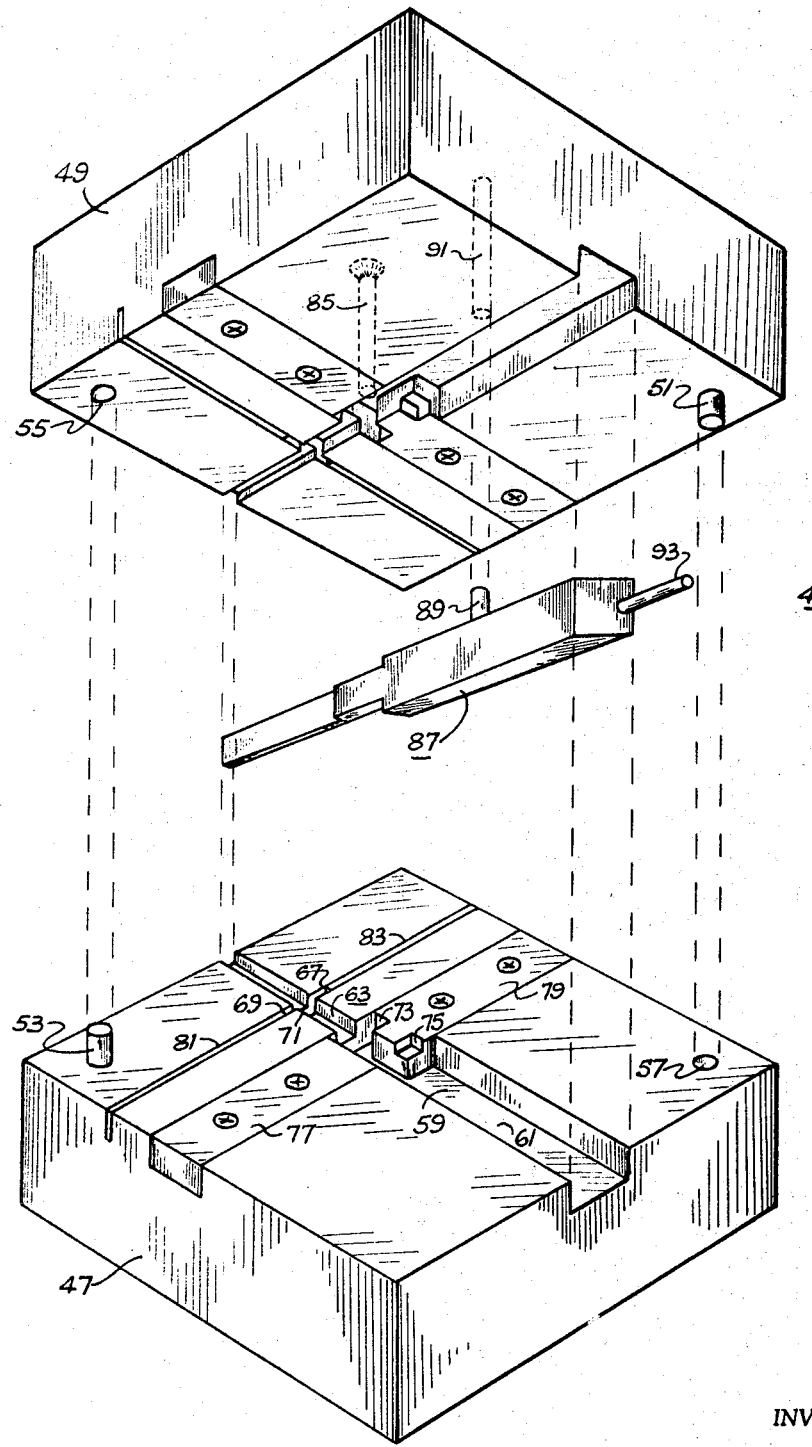
FIGURE 4 shows a detailed isometric view of the pressure injection mold used to produce the bobbin shown in FIGURES 1, 2 and 3.

The features of the pressure injection mold of FIGURES 4 and 5 are best understood by first referring to a description of the bobbin produced by the mold.

Figure 2:
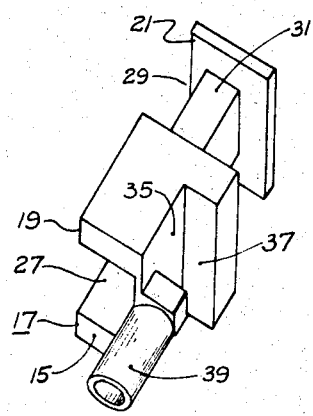
Figure 3:
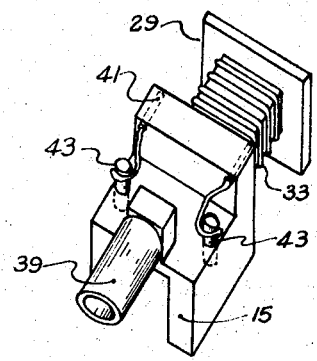

The bobbin is illustrated in FIGURES 1, 2 and 3 which show the bobbin in three positions as the bobbin is rotated about its longitudinal axis. The bobbin is made of body 11 which is composed of electrically nonconductive plastic or resinous material such as nylon, polystyrene, epoxy-type resins or the like formed in a generally rectangular configuration.

Body 11 has first end 13, second end 15 and mating side 17, which as shown in FIGURE 1 is formed by extreme top surfaces 19 and 21. Mating side 17 is in a plane parallel to the longitudinal axis of the bobbin so that this side will mate with a corresponding side or surface on a second bobbin when the bobbin is used to form a magnetic transducer. Body 11 also has a plurality of other sides with side 23 being on the opposite side of the body from mating side 17.

As shown in FIGURE 1, starting at first end 13 of the body is the first end of first aperture 25 which extends generally along a portion of the longitudinal axis of the body with the second end of the aperture between ends 13 and 15 of the body. For purposes of simplicity, tunnel or first aperture 25 is shown only in FIGURE 1.

In body 11, extending inward from mating side 17 and from second end 15 is first indentation 27 which extends to the second end of first aperture 25.

Near first end 13 of body 11 is second indentation 29 which extends inward from mating side 17 and circumscribes a portion of first aperture 25. This second indentation is separated from first aperture 25 by walls 31 of the body. When the bobbin is used in a magnetic transducer, coil 33, shown in FIGURE 3, made up of electrically conductive windings, is wound in second indentation 29. In order for the quality of magnetic transducer to be maintained, it is desirable that the nonconductive material in walls 31, which is that part of the body at the bottom of second indentation 29 and which separates the second indentation from the first aperture, be approximately 0.008 inch thick.

On side 23 which is the side of the body opposite the mating side, there is third indentation 35 which is separated from second indentation 29 by portion 37 of body 11.

At second end 15 of the body is integral tubular sleeve 39 which is separated from first indentation 27 by portion of body 11. This opening in this sleeve extends longitudinally from third indentation 35 outward from second end 15 of body 11.

When the illustrated bobbin is used in a magnetic transducer, there will be two passageways 41 extending longitudinally through portion 37 which separates second indentation 29 from third indentation 35. The two passageways are suitable for passing the two ends of the coil through portion 37. There may also be two terminal post holes in the bottom of third indentation 33 so that terminal posts 43 may be placed in these holes and the ends of the coil connected to them. These posts would also be useful for connection to terminal wires which would be passed through sleeve 39. Although these passageways and terminal holes are not molded by the pressure injection mold illustrated, they could be molded; however, this would unduly complicate the mold.

After much experimentation, it was found that a complicated component such as the described bobbin can best be produced by a pressure injection mold and core as illustrated in FIGURES 4 and 5.

FIGURE 4 represents a pressure injection mold 45 which is composed of a first section 47 and a second section 49. Dowels 51 and 53 are adapted to cooperate with holes 55 and 57. First section 47 contains a substantially rectangular depression 59 extending the extent of one dimension of the section. The length of depression 59 is divided to include a relatively deep, wide cavity 61 and a relatively shallow, narrow cavity 63 extending from inner end 65 of wide cavity 61 at the juncture of the wide and narrow cavities.

Narrow cavity 63 includes indentation or enlarged portion 67 between the two ends of the narrow cavity. This enlarged portion extends outward away from the longitudinal axis of the narrow cavity and around three sides of the cavity. This enlarged portion is positioned to form one end of the bobbin and has first planar surface 69 which forms surface 21 which is part of mating surface 17 of the bobbin.

Deeper wide cavity 61 has first planar surface 71 extending from inner end 65 of the wide cavity. Planar surface 71 and planar surface 69 of the enlarged portion of narrow cavity 63 are in the same plane. Planar surface 71 forms surface 19 which is part of mating surface 17 of the bobbin.

In wide cavity 61 on the opposite side of the cavity from first planar surface 71 is a shoulder which extends inward toward the longitudinal axis of the wide cavity thereby reducing the width of the open portion of the cavity. This shoulder forms third indentation 35 of the bobbin and is spaced along the longitudinal axis of the wide cavity from inner end 65 to leave indentation 73 which forms portion 37 of the bobbin. On the opposite side of the shoulder from indentation 73 is notch 75 which opens on two sides into the wide cavity.

Second mold section 49 contains a mirror image of depression 59.

Blocks 77 and 79 inserted in and secured to first section 47 as shown facilitate the machining of depression 59 in section 47. Similarly, blocks 81 and 83 are inserts that simplify the machining of enlarged portion 67 of the narrow cavity. Pressure injection aperture 85 is used to fill the mold depressions.

Removable metallic core 87 has a generally rectangular configuration and is adapted to cooperate with and fill portions of the narrow and wide cavities in the depressions in the mold sections in a maner so that the remaining portions of the depressions will form the bobbin when filled with pressure injected plastic. When the core is fitted into depression 59, the upper mold section of FIGURE 4 may be lowered onto locating pin or dowel 89 which fits into hole 91 to aid in positioning the core. Optional pin 93 extends into the outside end of the core and is used to aid in freeing the core from the mold.

FIGURE 5 shows a detailed view of core 87. The core has thick wide core portion 95 sized to fill an outer portion of the wide cavities in the depressions in the two mold sections. Extending longitudinally from inner end 97 of wide core portion 95 is thinner, narrower core portion 99. This narrower core portion is positioned on the wide portion and is sized to extend to at least enlarged portion 67 of the narrow cavities and to leave a space in the narrow cavities encircling the narrow core portion. When the core is placed in the mold and plastic extruded into this space, the plastic will form walls 31 of the bobbin and narrow core portion will form first aperture 25 of the bobbin.

Thinner narrower core portion 99 has an intermediate part extending longitudinally from inner end 97 of the wide core portion. This intermediate part has first planar surface 101 adapted to contact first planar surface 71 of wide cavity 61. Substantially perpendicular to first planar surface 101 is second surface 103 which extends inward toward the longitudinal axis of the narrower core portion. This second surface is positioned to leave a gap between this second surface and inner end 65 of wide cavity 61 when the core is positioned in the mold. The intermediate part of narrow core portion 99 is designed to create first indentation 27 of the bobbin.

Core 87 has a sleeve forming subassembly mounted with the core. This sleeve forming subassembly includes aperture 105 extending along a portion of the core parallel to the longitudinal axis of the core. Pin 107 is mounted on the core and extends through aperture 105 to contact a wall of wide cavity 61 when the core is positioned in the mold. As shown, aperture 105 extends longitudinally into inner end 97 of wide core portion 95. Pin 107 has a cross section smaller than the cross section of aperture 105 thereby leaving a gap between the pin and walls of the aperture. This gap encircles the pin and, when filled with plastic, forms sleeve 39 of the bobbin. The pin forms an aperture through the sleeve since the pin contacts a wall of the cavity. When the wide cavity has a shoulder with notch 75, the size, length and position of pin 107 will be such that the end of the pin will extend longitudinally beyond the end of aperture 105 across notch 75 to contact a wall of the notch and to leave a gap between the pin and remaining walls of the notch as well as aperture 105. This gap encircles the pin, and the pin will form a hole extending into third indentation 35 of the bobbin.

Pin 107 may or may not be a part of pin 93. If pin 107 is a part of 93, a smaller diameter aperture for the pin may be drilled through wide core portion 95 with its center the same as aperture 105.

As stated previously, after much experimentation, it was found that a complicated component such as the bobbin shown in FIGURES 1, 2 and 3 can best be produced by pressure injection molding using the mold and core illustrated in FIGURES 4 and 5. To produce the same bobbin by potting, machining or other conventional bobbin-making operation requires excessive labor and expense. For instance, if the bobbin is produced by machining operations, average production amounts to about one bobbin per machinist every three hours. Potting is equally impractical since a relatively long setting or curing period is required. In addition the potting operation cannot produce the extremely thin walls 31 that are required to separate the coil from magnetic laminations placed in first aperture 25. For best operation of the transducer, walls 31 should range from about 0.004 to 0.015 inch thick. When a pressure injection mold such as shown in FIGURE 4 is utilized to produce the bobbins, average production can range up to about 35 bobbins per mold per hour. The pressure injected plastic is forced into the mold under a pressure of about 4,000 p.s.i. so that thin walls 31, FIGURE 1, are produced and the entire bobbin is formed within a matter of seconds. Since the operation utilizes a cold mold, the plastic dries instantly and the bobbin can be removed immediately after injection.

In operation of the mold, molten plastic such as nylon is pressure injected through aperture 85 into the portions of the depression left vacant by core 87 to form the described bobbin. Each bobbin's over-all length is approximately 0.75 inch and maximum width is approximately 0.30 inch. After the molding operation, flashings are removed and the bobbin is used to manufacture the magnetic transducer described in copending application 220,242, filed Aug. 29, 1962, which is incorporated herein by reference.

It is to be observed that although the specific embodiment of the invention has been illustrated and described for producing bobbins especially suited for producing magnetic transducers operating with drums rotating within a certain speed range and component sizes and configurations recited therewith, various modifications and substitutions may be made, which will be obvious to those skilled in the art, without departing from the scope of the present invention which is limited only by the appended claims.

What is claimed is:

1. A pressure injection mold adapted to form a unitary bobbin for a magnetic transducer comprising,
    (a) a first mold section having a substantially rectangular depression extending the length of one dimension of said first section, said depression including a deep, wide cavity and a shallow, narrow cavity extending from said wide cavity,
    (b) a second mold section cooperatively engageable with said first section and having a depression of the same shape as said depression in said first section,
    (c) a removable metallic core having a generally rectangular configuration and adapted to fill portions of said narrow and said wide cavities in said depressions in said first and second sections in a manner so that remaining portions of said depressions in said first and second sections form the bobbin, said core also including a locating pin adapted to fit into an aperture in one of said sections and a sleeve forming subassembly mounted within said core.

2. In a pressure injection mold as set forth in claim 1 wherein the sleeve forming subassembly includes an aperture extending along a portion of the core parallel to the longitudinal axis of the core and a pin mounted on said core and extending through said aperture.

3. In a pressure injection mold as set forth in claim 2 wherein a shoulder adjacent the deep, wide cavity partially encircles at least a portion of the pin in the subassembly extending beyond the aperture.

4. In a pressure injection mold as set forth in claim 1 wherein in paragraph (a) the shallower narrow cavity has an enlarged portion between the two ends of said narrow cavity, said enlarged portion extending outward away from the longitudinal axis of said narrow cavity and around three sides of said narrow cavity, said enlarged portion having a first planar surface, and the deeper wide cavity has a first planar surface extending from the inner end of said wide cavity at the juncture of said wide and narrow cavities, said first planar surface of said wide cavity being in the same plane as said first planar surface of said enlarged portion of said narrow cavity.

5. In a pressure injection mold as set forth in claim 4 wherein the core has a thick wide core portion sized to fill an outer portion of said wide cavities in said depressions in said first and second mold sections, a thinner narrower core portion extending longitudinally from the end of said wide core portion, part of said narrower core portion being positioned and sized to extend to at least said enlarged portion of said narrow cavities in said depressions and to leave a space in said narrow cavities encircling said narrower core portion.

6. In a pressure injection mold as set forth in claim 5 wherein the sleeve forming subassembly includes an aperture extending longitudinally into the end of said wide core portion nearest said inner end of said wide cavity, and a pin mounted on said core and extending through said aperture with the end of said pin positioned to contact a wall of said wide cavity, said pin having a cross section smaller than said aperture thereby leaving a gap between said pin and the walls of said aperture, said gap encircling said pin.

7. In a pressure injection mold as set forth in claim 5 wherein the thinner narrower core portion has an intermediate part extending longitudinally from the end of said wide core portion, said intermediate part having a first planar surface adapted to contact the first planar surface of said wide cavity and having a second surface substantially perpendicular to said first planar surface, said second surface extending inward toward the longitudinal axis of said narrower core portion and being positioned to leave a gap between said second surface and said inner end of said wide cavity when said core is positioned in said mold.

8. In a pressure injection mold as set forth in claim 7 wherein the sleeve forming subassembly includes an aperture extending longitudinally into the end of said wide core portion nearest said inner end of said wide cavity, and a pin mounted on said core and extending through said aperture with the end of said pin positioned to contact a wall of said wide cavity, said pin having a cross section smaller than said aperture thereby leaving a gap between said pin and the walls of said aperture, said gap encircling said pin.

9. In a pressure injection mold as set forth in claim 4 wherein there is a shoulder on the opposite side of said wide cavity from said first planar surface, said shoulder extending inward toward the longitudinal axis of said wide cavity thereby reducing the width of said wide cavity, said shoulder being spaced along the longitudinal axis of said wide cavity from said inner end of said wide cavity so as to leave an indentation, and a notch in said shoulder, said notch being on the opposite side of said shoulder from said indentation and opening into said wide cavity.

10. In a pressure injection mold as set forth in claim 9 wherein the core has a thick wide core portion sized to fill an outer portion of said wide cavities in said depressions in said first and second mold sections, a thinner narrower core portion extending longitudinally from the end of said wide core portion, part of said narrower core portion being positioned and sized to extend to at least said enlarged portion of said narrow cavities in said depressions and to leave a space in said narrow cavities encircling said narrower core portion.

11. In a pressure injection mold as set forth in claim 10 wherein the sleeve forming subassembly includes an aperture extending longitudinally into the end of said wide core portion nearest said inner end of said wide cavity, and a pin mounted on said core and extending through said aperture with the end of said pin positioned to contact a wall of said wide cavity, the size, length and position of said pin being such that end of said pin extends longitudinally beyond the end of said aperture across said notch to contact said wall of said wide cavity and to leave a gap between said pin and the walls of said aperture and said notch, said gap encircling said pin.

12. In a pressure injection mold as set forth in claim 10 wherein the thinner narrower core portion has an intermediate part extending longitudinally from the end of said wide core portion, said intermediate part having a first planar surface adapted to contact the first planar surface of said wide cavity and having a second surface substantially perpendicular to said first planar surface, said second surface extending inward toward the longitudinal axis of said narrower core portion and being positioned to leave a gap between said second surface and said inner end of said wide cavity when said core is positioned in said mold.

13. In a pressure injection mold as set forth in claim 12 wherein the sleeve forming subassembly includes an aperture extending longitudinally into the end of said wide core portion nearest said inner end of said wide cavity, and a pin mounted on said core and extending through said aperture with the end of said pin positioned to contact a wall of said wide cavity, the size, length and position of said pin being such that end of said pin extends longitudinally beyond the end of said aperture across said notch to contact said wall of said wide cavity and to leave a gap between said pin and the walls of said aperture and said notch, said gap encircling said pin.

References Cited
UNITED STATES PATENTS

| | | | |
|---|---|---|---|
| 2,683,899 | 7/1954 | Reichenbach | 18—36 X |
| 3,044,127 | 7/1962 | Alden. | |
| 3,045,290 | 7/1962 | Anderson et al. | |
| 3,074,112 | 1/1963 | Bobrow | 249—83 X |
| 3,117,349 | 1/1964 | Woods et al. | 249—83 |
| 3,120,696 | 2/1964 | Lubkin | 29—603 |

J. SPENCER OVERHOLSER, *Primary Examiner.*

J. HOWARD FLINT, JR., *Assistant Examiner.*

U.S. Cl. X.R.

18—42; 29—603; 249—145

UNITED STATES PATENT OFFICE
CERTIFICATE OF CORRECTION

Patent No. 3,421,730                      January 14, 1969

John P. Woods et al.

It is certified that error appears in the above identified patent and that said Letters Patent are hereby corrected as shown below:

Column 3, line 15, after "walls of" insert -- the notches in --.

Signed and sealed this 17th day of March 1970.

(SEAL)
Attest:

Edward M. Fletcher, Jr.                WILLIAM E. SCHUYLER, JR.
Attesting Officer                        Commissioner of Patents